No. 774,445. PATENTED NOV. 8, 1904.
J. MOORE.
TRUCK.
APPLICATION FILED FEB. 23, 1904.
NO MODEL.
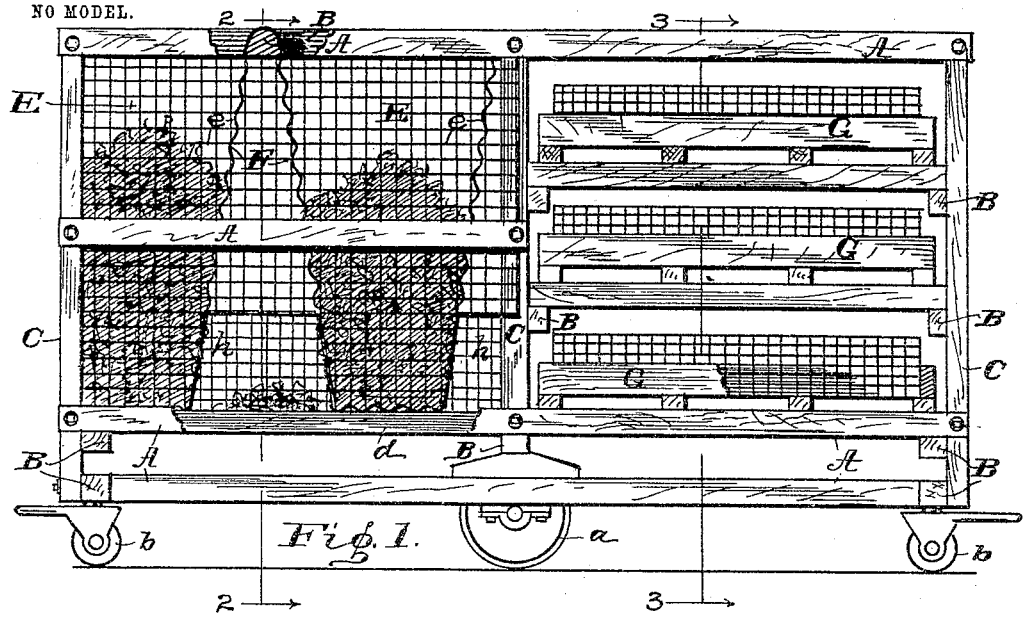
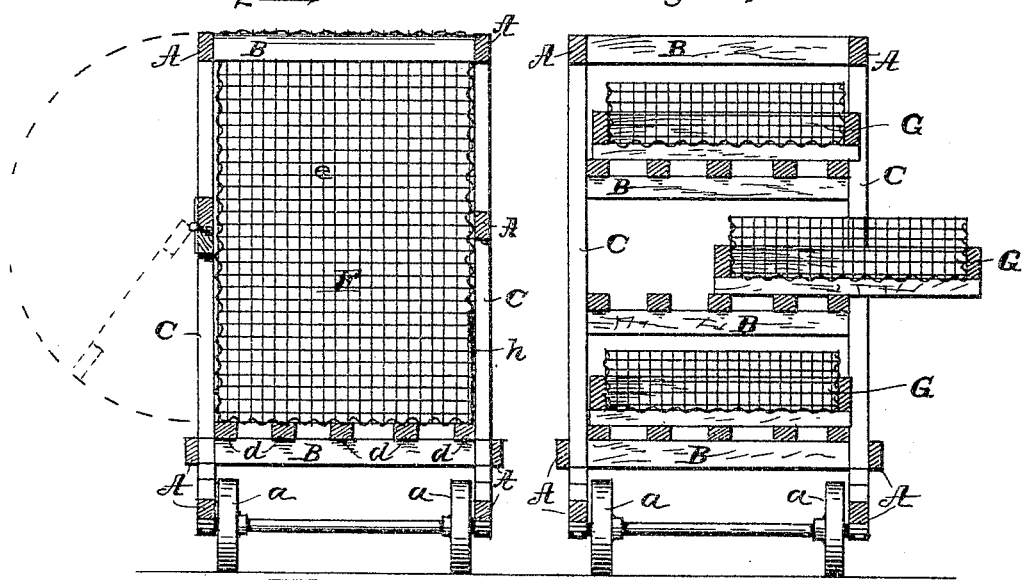
Witnesses,
S. Mahlon Norges.
Jno. R. Sherwood
Inventor,
John Moore,
By Joseph A. Minturn,
Attorney.

No. 774,445. Patented November 8, 1904.

UNITED STATES PATENT OFFICE.

JOHN MOORE, OF INDIANAPOLIS, INDIANA.

TRUCK.

SPECIFICATION forming part of Letters Patent No. 774,445, dated November 8, 1904.

Application filed February 23, 1904. Serial No. 194,833. (No model.)

*To all whom it may concern:*

Be it known that I, JOHN MOORE, a citizen of the United States, residing at Indianapolis, in the county of Marion and State of Indiana, have invented certain new and useful Improvements in Trucks, of which the following is a specification.

This invention relates to improvements in trucks, and has special reference to improvements in trucks to be used in packing-houses, where dressed meats are prepared on a large scale, the object being to provide a wheeled receptacle for all kinds of scrap meats, tongues, and the like, into which the pieces can be thrown as soon as detached and collected in large quantities, which can be run into the the cooling-room when the truck is full and thoroughly cooled there without removal from the truck.

In establishments where large numbers of animals are killed and dressed the scraps of meat which accumulate are of great value, and by methods heretofore in vogue the pieces have been collected in single large masses, to the middle portions of which there was no access of air and which had to be run into the cooling-room and unloaded and spread out to prevent loss by overheating and spoiling of the inner portions, the spoiling of which would in turn contaminate the whole mass; and one of the objects of this invention is to separate and ventilate the middle portions of the bulk.

While this invention is specially adapted to the handling of meat "scrap," it is applicable to the handling of other perishable products, as fruit and the like, and it is not desired to limit its use to any particular article.

I accomplish the objects of the invention by the mechanism illustrated in the accompanying drawings, in which—

Figure 1 is a view in side elevation, partially in vertical section, of my invention; Fig. 2, a vertical section of same on the dotted line 2 2 of Fig. 1, and Fig. 3 a like section on the dotted line 3 3 of Fig. 1.

Like letters of reference indicate like parts throughout the several views of the drawings.

The frame of the truck, comprising the horizontal members A, running longitudinally of the truck, the transverse horizontal members B, and vertical members C may be and is of any well-known and suitable construction to give the required support and strength, and this frame is mounted on the two wheels $a\ a$, placed approximately at the mid-length of the truck, and the single end swivelly-mounted wheels $b$. Formed on the inside of the frame and supported by it are the meat-holding receptacles E E, the bottom and sides of which are made out of wires $e$, suitably woven together and secured to provide substantial support for the meat scraps without retarding the circulation of air. The bottom wires are supported by the several longitudinal stringers $d$, as shown in Fig. 2. The two compartments E E are separated by double wire partitions F F, which are sufficiently removed from each other to give an ample air-space between the compartments, and to enable the particles which drop through the meshes of the woven-wire partition onto the floor to be removed I provide hand-holes $h$, leading through the side walls into the ventilating-compartments.

The compartments E will be filled by throwing the pieces into them through the open tops; but for convenience in emptying I prefer to divide one of the side walls longitudinally and hinge the upper portion, as shown in Fig. 2, which makes it easier to reach into the compartments to remove the lower contents.

The compartments E, as shown in Fig. 1, occupy about one-half of the length of the truck. The remaining portion of the truck will be divided off into horizontal compartments to receive the sliding drawers G. These consist of receptacles, the bottom and sides of which are made out of woven wire and a wooden framework to support and stiffen the wire receptacles. These drawers are more convenient and suitable for handling tongues, which have to be put through a pickling-bath and handled more than the other scrap.

It is evident that the truck might be made up wholly of compartments like those shown at E, with the ventilating-chambers between them, or wholly of drawer-receptacles, and I therefore do not wish to limit this invention to a composite truck, such as shown in the drawings, nor to a truck made wholly with drawers or of compartments; but What I do claim as new, and wish to secure by Letters Patent, is—

In a truck for the purposes specified, a frame mounted on wheels, perforated bottom and sides supported by the frame to form a receptacle, partitions of woven wire or other perforated material separating the receptacle into smaller compartments, said partitions being in pairs sufficiently remote from each other to form air-passages, hand-holes into the air-passages and a hinged side to the compartments, as and for the purposes specified.

In witness whereof I have hereunto set my hand and seal, at Indianapolis, Indiana, this 16th day of February, A. D. 1904.

JOHN MOORE. [L. S.]

Witnesses:
F. W. NOBLE,
J. A. MINTURN.